US011339078B2

(12) United States Patent
Olverson et al.

(10) Patent No.: US 11,339,078 B2
(45) Date of Patent: May 24, 2022

(54) FLOAT BATH EXIT SEAL

(71) Applicant: PILKINGTON GROUP LIMITED, Lathom (GB)

(72) Inventors: Karl Olverson, Burscough (GB); Gavin Parry, Prescot (GB); Mark David Lynam, Wigan (GB); Ian Ross Williams, Wigan (GB); David Lawrenson, Prescot (GB)

(73) Assignee: Pilkington Group Limited, Lathom (GB)

( * ) Notice: Subject to any disclaimer, the term of this patent is extended or adjusted under 35 U.S.C. 154(b) by 471 days.

(21) Appl. No.: 16/329,843

(22) PCT Filed: Sep. 1, 2017

(86) PCT No.: PCT/GB2017/052543
§ 371 (c)(1),
(2) Date: Mar. 1, 2019

(87) PCT Pub. No.: WO2018/042183
PCT Pub. Date: Mar. 8, 2018

(65) Prior Publication Data
US 2019/0233318 A1    Aug. 1, 2019

(30) Foreign Application Priority Data
Sep. 2, 2016    (GB) ..................... 1614954

(51) Int. Cl.
*C03B 18/16* (2006.01)
*C03B 18/20* (2006.01)
(52) U.S. Cl.
CPC .............. *C03B 18/16* (2013.01); *C03B 18/20* (2013.01)

(58) Field of Classification Search
CPC ................................ C03B 18/16; C03B 18/20
See application file for complete search history.

(56) References Cited

U.S. PATENT DOCUMENTS 3,351,450 A * 11/1967 Silverwood ............. C03B 18/16
65/157
3,351,451 A    11/1967 Barradell-Smith
(Continued)

FOREIGN PATENT DOCUMENTS

DE    102007009495 A1    8/2008
DE    102014203567 A1    9/2015
(Continued)

OTHER PUBLICATIONS

European Patent Office, International Search Report with Written Opinion issued in PCT/GB2017/052543, dated Nov. 17, 2017, 13 pages, European Patent Office, Rijswijk, Netherlands.

*Primary Examiner* — Cynthia Szewczyk
(74) *Attorney, Agent, or Firm* — Marshall & Melhorn, LLC

(57) ABSTRACT

A method of reducing the volume of float bath atmosphere lost from an opening in the exit end of the float bath is described. The method comprises directing a first jet of fluid having a first jet velocity followed by a second jet velocity towards a plane a conveyance for a float glass ribbon. An obstruction in the path of the first jet of fluid causes the jet to change from the second to a third jet velocity. The obstruction may be a portion of a roller positioned outside the opening or a float glass ribbon that has been formed on a surface of molten metal contained in the float bath that has subsequently been transferred through the opening. A float bath having sealing means to reduce atmosphere loss from an exit of the float bath is also described, as is an assembly useful in carrying out the aforementioned methods.

20 Claims, 6 Drawing Sheets

(56) References Cited

U.S. PATENT DOCUMENTS

| | | | | |
|---|---|---|---|---|
| 3,443,922 A | * | 5/1969 | Settino | F16C 13/00 |
| | | | | 420/440 |
| 4,692,180 A | | 9/1987 | Villain et al. | |
| 2011/0301014 A1 | * | 12/2011 | Kim | C03B 18/20 |
| | | | | 501/11 |
| 2012/0184427 A1 | | 7/2012 | Kim et al. | |

FOREIGN PATENT DOCUMENTS

| | | | | | |
|---|---|---|---|---|---|
| EP | 2641881 A1 | * | 9/2013 | | C03B 25/08 |
| GB | 1017753 | | 1/1966 | | |
| JP | 2000239035 A | * | 9/2000 | | C03B 18/16 |
| JP | 3217176 B2 | | 10/2001 | | |
| KR | 20130143252 A | | 12/2013 | | |
| WO | 2006007905 A2 | | 1/2006 | | |
| WO | WO-2009148139 A1 | * | 12/2009 | | C03B 18/02 |
| WO | 2015093432 A1 | | 6/2015 | | |

* cited by examiner

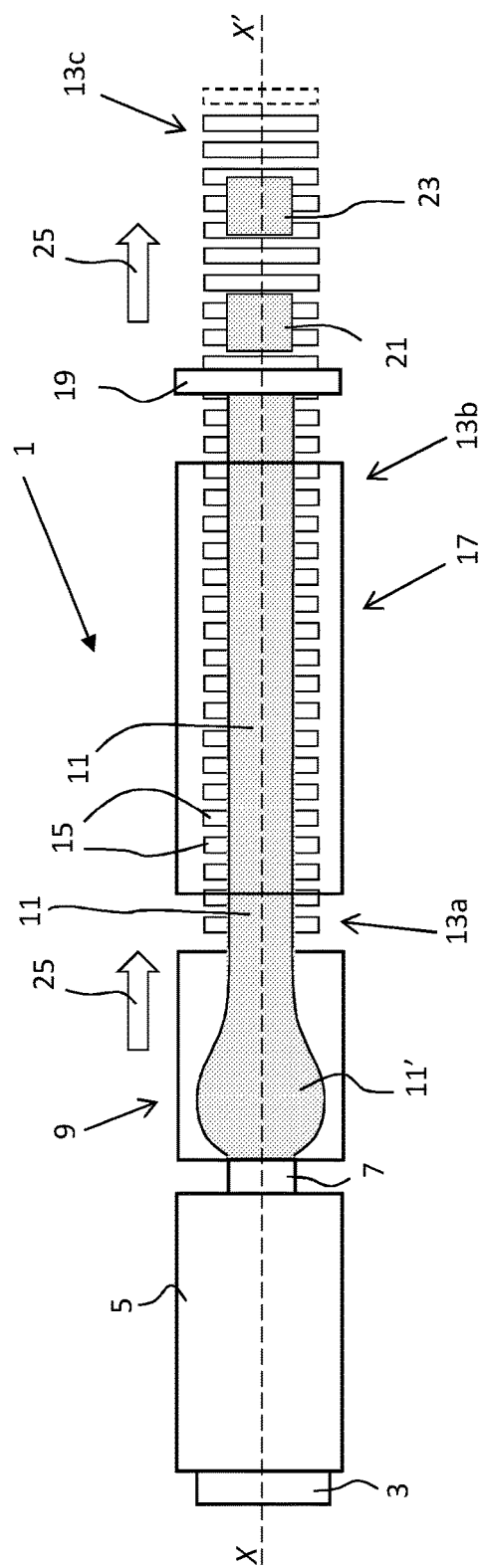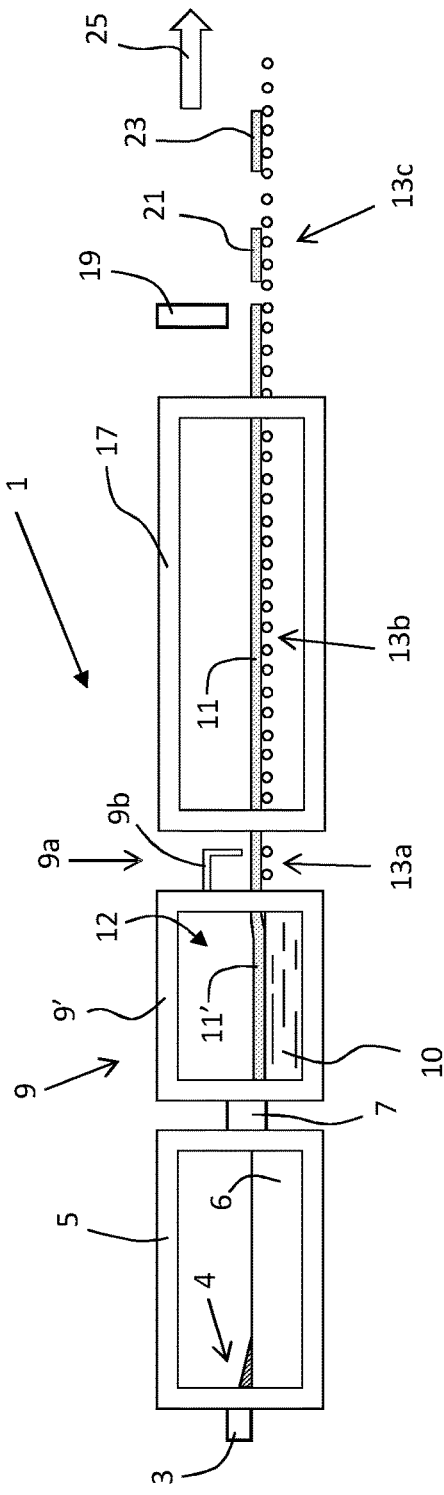
Fig. 1
Fig. 2

FLOAT BATH EXIT SEAL

BACKGROUND OF THE INVENTION

The present invention relates to a method of reducing the volume of float bath atmosphere lost from an exit end of a float bath, to a float bath comprising sealing means for reducing the volume of float bath atmosphere lost from an exit end of a float bath and to an assembly for reducing the volume of bath atmosphere lost from an exit end of a float bath.

It is well known that flat glass may be manufactured using a "float process", where molten glass is formed into a flat sheet or ribbon using a "float bath". Suitable glass making raw materials are converted to molten glass in a furnace by the application of suitable energy, and the molten glass is transferred to a bath of molten tin (the float bath) to be supported on the surface thereof. In order to prevent the molten tin from oxidation, the float bath is enclosed and a reducing bath atmosphere is provided above the molten tin. The reducing bath atmosphere is usually a mixture of nitrogen and hydrogen. Typically the float bath atmosphere is at positive pressure, for example between 1 and 30 Pa, to prevent ingress of air into the float bath.

Given that it is necessary to have at least an inlet and an exit to the float bath in order to introduce molten glass onto the tin, and to remove the formed glass therefrom, reducing bath atmosphere may escape from the inlet end and the exit end of the float bath. Escape of reducing atmosphere from the exit end of the float bath is particularly problematic because the outlet vents to the external atmosphere, and may produce a flame as combustible hydrogen burns in air.

It is desirable to reduce or eliminate the escape of bath atmosphere from the float bath exit because this affects the cost effectiveness of the glass making process. By reducing the volume of bath atmosphere that is lost from the exit, less bath atmosphere needs to be used to maintain a positive pressure atmosphere in the float bath.

WO2006007905A2 describes a device for the production of flat glass by the float method with a float chamber and several serially-arranged gap seals, whereby the last gap seal in the direction of travel of the strip, arranged at the glass outlet end, is separated from the ambient atmosphere by the atmosphere in the float chamber and is provided on the gas exit side with a convex surface by means of which the gas flow exiting from the seal gap is deflected from the surface of the glass strip by the Coanda effect. As the atmosphere from inside the float chamber is combustible, WO2006007905A2 provides a device and method for preventing flames from contacting the glass surface as the glass exits the float chamber.

In U.S. Pat. No. 4,692,180 escape of bath atmosphere from a float bath exit is described. The float bath exit is divided into two chambers (a first chamber and a second chamber downstream thereof) separated by three curtains, an upstream curtain, a central curtain and a downstream curtain. Combustible gases escape under the downstream curtain and burn to form a flame that disturbs a subsequent coating process. Blower means are used to direct a flow of gas toward the base of the downstream curtain defining the bath outlet. The flame is caused to be re-situated upstream in the second chamber at the base of the central curtain. As a result the atmosphere in the second chamber varies from that desired for the bath atmosphere in the second chamber which may result in subsequent leakage into the main bath atmosphere.

GB1,017,753 describes an apparatus for use in the manufacture of flat glass during which a ribbon of glass is advanced along a bath of molten metal wherein means for maintaining a plenum of protective atmosphere in the headspace above the bath are provide. Alternatively a conveying roll may be placed in a pit therebeing also provided a sealing means such as a carbon brush spring supported in a seat attached to the floor of the pit, the brush being in sealing relation with the roll. A plenum of protective gas is also maintained in this pit.

U.S. Pat. No. 3,351,451 describes a method of manufacturing flat glass in ribbon form during which the glass is supported on a bath of molten metal, the headspace over the bath being charged with a protective atmosphere maintained at a plenum, creating outward laminar flow of protecting gas through a channel for the glass communicating with the headspace, the rate of flow of said protective gas being sufficient to seal the channel against ingress of external atmosphere to the protective atmosphere.

DE102014203567A1 describes a float glass manufacturing method for manufacturing float plate glass that involves arranging a flame on the upper side of the glass ribbon at specific locations of the drawing zone.

SUMMARY OF THE INVENTION

There is a need for a method of at least partially sealing an exit end of a float bath to reduce the volume of bath atmosphere lost from the float bath.

Accordingly the present invention provides from a first aspect a method of reducing the volume of float bath atmosphere lost from an exit end of a float bath comprising the steps (i) providing a source of molten glass to an entrance end of the float bath; (ii) forming the molten glass into a ribbon of glass on a surface of a pool of molten metal contained in the float bath such that the ribbon of glass has an upper surface not having been in contact with the molten metal; (iii) transferring the ribbon of glass from the surface of the pool of molten metal through an opening in the exit end of the float bath onto a conveying means for conveying the ribbon of glass in a first direction of conveyance away from the opening; and (iv) directing at least one (a first) jet of fluid towards the upper surface of the ribbon of glass, the first jet of fluid having a first jet velocity and a subsequent second jet velocity, the first jet velocity of the first jet of fluid having a first jet speed and a first jet direction and the second jet velocity of the first jet of fluid having a second jet speed and a second jet direction; wherein the first jet of fluid having the second jet velocity changes from the second jet velocity to a third jet velocity due to the presence of the upper surface of the ribbon of glass to reduce the volume of bath atmosphere lost from the float bath via the opening.

As is known in the art, a float bath comprises an enclosure for containing the pool of molten metal (usually tin) and the float bath atmosphere. Float bath atmosphere is above the molten metal in the enclosure, often said to be in a headspace above the molten metal, and prevents oxidation of the molten metal.

When the first jet of fluid changes from the second jet velocity to the third jet velocity, sufficient back pressure is produced to reduce the volume of bath atmosphere lost from the opening.

When the first jet of fluid has the third jet velocity, the first jet of fluid has a third jet direction and a third jet speed.

Preferably the first jet of fluid having the second jet velocity is directed towards the upper surface of the ribbon of glass downstream of the opening.

Preferably upstream of the opening above the ribbon of glass is an atmosphere comprising a float bath atmosphere and downstream of the opening above the ribbon of glass is an air atmosphere. As is known in the art a float bath atmosphere comprises a mixture of nitrogen and hydrogen that is combustible in the presence of air.

Preferably at step (iv) the first jet of fluid is directed towards the upper surface of the ribbon of glass by jet means provided outside the float bath. In such embodiments the jet means are provided downstream of the exit end of the float bath and downstream of the opening in the exit end such that the jet means are in an air atmosphere and not in a float bath atmosphere.

Preferably at least a portion of the first jet of fluid having the second jet velocity and/or the third jet velocity makes contact with the upper surface of the ribbon of glass.

Preferably the third jet direction of the first jet of fluid is in the direction of conveyance.

Preferably the first jet of fluid having the second jet velocity changes velocity from the second jet velocity to the third jet velocity by striking the upper surface of the ribbon of glass.

Preferably the third jet velocity of the first jet of fluid is zero. When the third jet velocity of the first jet of fluid is zero there is a stagnation point in the flow field where the local velocity of the first fluid is zero. Such flow fields may be determined using Bernoulli's equation.

When the first jet of fluid having the second jet velocity changes velocity from the second jet velocity to the third jet velocity by striking the upper surface of the ribbon of glass, preferably the first jet of fluid strikes the upper surface of the ribbon of glass downstream of the opening.

Preferably the third jet velocity of the first jet of fluid has a velocity component parallel to, or substantially parallel to, the upper surface of the ribbon of glass.

Preferably the first jet direction of the first jet of fluid and/or the second jet direction of the first jet of fluid is at an angle of 65° or less to a normal on the upper surface of the ribbon of glass.

Preferably the first jet direction of the first jet of fluid and/or the second jet direction of the first jet of fluid is parallel to a normal on the upper surface of the ribbon of glass. Preferably the normal on the upper surface of the ribbon of glass is parallel to the vertical. Suitably the normal on the upper surface of the ribbon of glass is perpendicular to the first direction of conveyance.

Preferably a plurality of jets of fluid, each having a respective first jet velocity followed by a respective second jet velocity, are directed towards the upper surface of the ribbon of glass, wherein the plurality of jets of fluid each change from the respective second jet velocity to a respective third jet velocity due to the presence of the upper surface of the ribbon of glass to reduce the amount of bath atmosphere lost from the float bath via the opening in the exit end of the float bath. Preferably at least two of the plurality of jets of fluid has a first jet direction and/or a respective second jet direction that are parallel to each other. Preferably each of the plurality of jets of fluid having a respective second jet velocity are directed towards the upper surface of the ribbon of glass downstream of the opening.

Preferably the ribbon of glass has a soda-lime-silica glass composition. A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. The glass may also contain other additives, for example, refining aids, which would normally be present in an amount of up to 2%. The glass composition may also contain other additives, for example, refining aids, which would normally be present in an amount of up to 2%. The soda-lime-silica glass composition may contain other colouring agents such as $Co_3O_4$, NiO and Se to impart to the glass a desired colour when viewed in transmitted light. The transmitted glass colour may be measured in terms of a recognised standard such as BS EN410.

As is well known in the art, the molten metal is usually molten tin.

In some embodiments of the first aspect of the present invention the total volume of fluid in a predetermined time interval, for example one hour, provided to the at least one jet is less than the volume of bath atmosphere that escapes from the opening in the exit end of the float bath in the predetermined time interval without carrying out step (iv).

The afore described method according to the first aspect of the present invention may be used to reduce the volume of float bath atmosphere lost from an exit end of a float bath when there is not a ribbon of glass being transferred through an opening in the exit end of the float bath. In this situation, instead of the first jet of fluid having the second jet velocity striking the upper surface of the ribbon of glass to reduce the volume of bath atmosphere lost from the float bath via the opening, the first jet of fluid having the second jet velocity may change direction to a third jet velocity by a suitably positioned obstruction in the path of the first jet of fluid having the second jet velocity to reduce the volume of bath atmosphere lost from the float bath via the opening.

Accordingly from a second aspect the present invention provides a method of reducing the volume of float bath atmosphere lost from an exit end of a float bath, the float bath comprising an enclosure for containing the bath atmosphere, the exit end comprising an opening through which a ribbon of glass supported on a pool of molten metal contained in the enclosure can pass from inside the enclosure to a conveying means positioned outside the enclosure, the conveying means configured to convey the ribbon of glass in a first direction of conveyance away from the enclosure along a conveyance plane, the method comprising the step of (i) directing at least one (a first) jet of fluid towards the conveyance plane, the first jet of fluid having a first jet velocity and a subsequent second jet velocity, the first jet velocity of the first jet of fluid having a first jet speed and a first jet direction and the second jet velocity of the first jet of fluid having a second jet speed and a second jet direction; wherein the first jet of fluid having the second jet velocity changes from the second jet velocity to a third jet velocity due to the presence of an obstruction in the path of the first jet of fluid having the second jet velocity to reduce the volume of bath atmosphere lost from the float bath via the opening.

When the first jet of fluid changes from the second jet velocity to the third jet velocity, sufficient back pressure is produced to reduce the volume of bath atmosphere lost from the opening.

When the first jet of fluid has the third jet velocity, the first jet of fluid has a third jet direction and a third jet speed.

Suitably the obstruction is positioned outside of the opening. That is, it is preferred for the obstruction to be downstream of the opening.

Preferably upstream of the opening is an atmosphere comprising a float bath atmosphere and downstream of the opening is an air atmosphere.

Preferably the obstruction comprises at least a portion of a roller. Preferably the roller is part of the conveying means.

Preferably the portion of the roller is an outer surface of the roller, the outer surface being configured for conveying a ribbon of glass.

Preferably the obstruction comprises a deflecting element extending away from the opening. Preferably the deflecting element has a flat surface, the flat surface being that surface of the obstruction which caused the first jet of fluid having the second jet velocity to change to the third jet velocity to reduce the volume of bath atmosphere lost from the float bath via the opening. Preferably the deflecting element comprises a refractory material. Preferably the deflecting element comprises metal, preferably steel.

Preferably the first jet of fluid having the second jet velocity is directed towards the conveyance plane downstream of the opening.

Preferably at least a portion of the first jet of fluid having the second jet velocity and/or the third jet velocity makes contact with the obstruction.

Preferably the third jet velocity of the first jet of fluid has a third jet direction and the third jet direction of the first jet of fluid is in the direction of conveyance.

Preferably the first jet of fluid having the second jet velocity changes velocity from the second jet velocity to the third jet velocity by striking the obstruction.

Preferably the third jet velocity of the first jet of fluid is zero. When the third jet velocity of the first jet of fluid is zero there is a stagnation point in the flow field where the local velocity of the first fluid is zero. Such flow fields may be determined using Bernoulli's equation.

When the first jet of fluid having the second jet velocity changes velocity from the second jet velocity to the third jet velocity by striking the obstruction, preferably the first jet of fluid strikes the obstruction downstream of the opening.

Preferably the obstruction has a first surface substantially parallel to the conveyance plane, the first surface being that surface which the causes the first jet of fluid to change from the second jet velocity to the third jet velocity.

Preferably the third jet velocity of the first jet of fluid has a velocity component parallel to, or substantially parallel to, the conveyance plane.

Preferably the first jet direction of the first jet of fluid and/or the second jet direction of the first jet of fluid is at an angle of 65° or less to a normal on the conveyance plane and/or a normal on the obstruction.

Preferably the first jet direction of the first jet of fluid and/or the second jet direction of the first jet of fluid is parallel to a normal on the conveyance plane and/or the obstruction. Preferably the normal on the conveyance plane and/or the obstruction is parallel to the vertical. Suitably the normal on the on the conveyance plane and/or the obstruction is perpendicular to the first direction of conveyance.

Preferably a plurality of jets of fluid, each having a respective first jet velocity followed by a respective second jet velocity, are directed towards the conveyance plane, wherein the plurality of jets of fluid each change from the respective second jet velocity to a respective third jet velocity due to the presence of the obstruction to reduce the amount of bath atmosphere lost from the float bath via the opening in the exit end of the float bath. Preferably at least two of the plurality of jets of fluid has a first jet direction and/or a respective second jet direction that are parallel to each other. Preferably each of the plurality of jets of fluid having the respective second jet velocity are directed towards the obstruction downstream of the opening.

In some embodiments the second aspect of the present invention the total volume of fluid in a predetermined time interval, for example one hour, provided to the at least one jets is less than the volume of bath atmosphere that escapes from the float bath exit in the predetermined time interval without carrying out step (i).

As will be readily apparent, when the method according the second aspect of the present invention comprises, before step (i), the steps of providing a source of molten glass to an entrance end of the float bath; forming the molten glass into a ribbon of glass on a surface of a pool of molten metal contained in the float bath such that the ribbon of glass has an upper surface not having been in contact with the molten metal; and transferring the ribbon of glass from the surface of the pool of molten metal through an opening in the exit end of the float bath onto a conveying means for conveying the ribbon of glass in the first direction of conveyance away from the opening, the obstruction is the upper surface of the ribbon of glass. In these embodiments of the second aspect of the present invention, the method is the same, or substantially the same, as a method according to the first aspect of the present invention.

Embodiments of the first and/or second aspects of the present invention have other preferable features as described below.

When the first jet of fluid has the first jet velocity, the first jet of fluid has a first jet speed and a first jet direction. When first jet of fluid has the second jet velocity, the first jet of fluid has a second jet speed and a second jet direction.

In general if there are n jets of fluid, the nth jet of fluid has a first jet velocity, a second jet velocity and a third jet velocity. The first jet velocity of the nth jet of fluid has a first jet direction and a first jet speed. The second jet velocity of the nth jet of fluid has a second jet direction and a second jet speed. The third jet velocity of the nth jet of fluid has a third jet direction and a third jet speed.

Preferably the first jet speed of the first jet of fluid is the same as the second jet speed of the first jet of fluid.

Preferably the first jet speed of the first jet of fluid and/or the second jet speed of the first jet of fluid is less than the speed of sound in dry air at 20° C.

Preferably the first jet speed of the first jet of fluid and/or the second jet speed of the first jet of fluid is less than 340 m/s.

The first jet velocity of the first jet of fluid and/or the second jet velocity of the first jet of fluid is/are sufficient to reduce the volume of bath atmosphere lost from the opening.

The first jet speed of the first jet of fluid and/or the second jet speed of the first jet of fluid is/are sufficient to reduce the volume of bath atmosphere lost from the opening.

The first jet direction of the first jet of fluid and/or the second jet direction of the first jet of fluid is/are sufficient to reduce the volume of bath atmosphere lost from the opening.

The first jet velocity of the first jet of fluid and/or the second jet velocity of the first jet of fluid is/are sufficient to provide the first jet of fluid with a third jet velocity that is sufficient to reduce the volume of bath atmosphere lost from the opening.

Preferably the first jet direction of the first jet of fluid is the same as the second jet direction of the first jet of fluid.

Preferably the first jet direction of the first jet of fluid comprises a velocity component counter to the first direction of conveyance. In embodiments when the first jet direction of the first jet of fluid comprises a velocity component counter to the first direction of conveyance, the first jet of fluid is directed towards the exit end of the float bath.

In other embodiments of the first and/or second aspects of the present invention, preferably the first jet direction of the first jet of fluid is caused to change direction such that the second jet direction of the first jet of fluid is different to the first jet direction of the first jet of fluid.

When the first jet of fluid is caused to change direction such that the second jet direction of the first jet of fluid is different to the first jet direction of the first jet of fluid, preferably the first jet is caused to change direction from the first jet direction to the second jet direction by impacting on a deflecting surface.

Preferably the first jet direction of the first jet of fluid is at an angle to the vertical between 30° and 60°, preferably between 40° and 50°, more preferably between 44° and 46°, and following impacting the deflecting surface, the second jet direction of the first jet of fluid is at an angle of less than 30° to the vertical, preferably less than 20° to the vertical, more preferably less than 10° to the vertical, most preferably less than 5° to the vertical.

Preferably the deflecting surface is positioned downstream of the opening.

Preferably the deflecting surface is positioned above the opening in the exit end of the float bath.

Preferably the first jet of fluid impacts the deflecting surface at an impact region above the opening, the impact region being spaced from the upper surface of the ribbon of glass, or if no ribbon of glass is present, from the conveyance plane. Preferably the impact region is spaced from the upper surface of the ribbon of glass, or if no ribbon of glass is present, from the conveyance plane, by at least 10 mm, or at least 20 mm, or at least 30 mm, or at least 40 mm, or at least 50 mm, or at least 60 mm, or at least 70 mm, or at least 80 mm, or at least 90 mm, or at least 100 mm. Preferably the impact region is spaced from the upper surface of the ribbon of glass, or if no ribbon of glass is present, from the conveyance plane, by less than 300 mm, more preferably by less than 250 mm, even more preferably less than 200 mm. The location of the impact region may be used to alter the amount of pre-heat provided to the first jet fluid.

Preferably the deflecting surface comprises heating means to provide a heated deflecting surface. An advantage of having a heated deflecting surface is that the first jet of fluid may be pre-heated, preferably such that the first jet of fluid having the second jet velocity is hotter than first jet of fluid having the first jet velocity.

Preferably the deflecting surface is at a temperature greater than 400° C., more preferably greater than 450° C., even more preferably greater than 500° C. The deflecting surface typically has a maximum operating temperature dependent upon the materials used for the construction thereof. Typically the deflecting surface is at a temperature less than 1000° C.

The deflecting surface may be heated by heat from inside the float bath, or by separate heating means, which may be controllable.

In some embodiments of the first and/or second aspects of the present invention, the first jet of fluid is provided by a fluid source comprising a fluid outlet means and at least one heater for heating the fluid that flows from the fluid outlet means. The fluid outlet means may comprise a tube or pipe, which may be flexible, and the at least one heater may surround at least a portion of the tube or pipe.

In some embodiments of the first and/or second aspects of the present invention having a deflecting surface, the deflecting surface is a barrier configured to reduce the volume of bath atmosphere lost from the opening in the exit end of the float bath, preferably when a ribbon of glass is transferred from inside the enclosure via the opening to the conveying means.

Preferably the barrier is configured such that when a glass ribbon is conveyed on the conveying means through the opening, the barrier forms a gap between the glass ribbon surface not in contact with the conveying means, and a lower edge of the barrier, the gap being sized to limit escape of bath atmosphere from inside the enclosure. Preferably the gap is between 5 mm and 50 mm. Preferably the gap extends across the opening. Preferably the gap is at least a portion of the opening. Preferably the gap is the same as the opening.

In some embodiments of the first and/or second aspects of the present invention having a deflecting surface, the deflecting surface is downstream of the opening in the exit end of the float bath.

In some embodiments of the first and/or second aspects of the present invention having a deflecting surface, the deflecting surface has as least one flat major surface.

In some embodiments of the first and/or second aspects of the present invention having a deflecting surface, the deflecting surface extends across at least a portion of the exit.

Preferably the deflecting surface extends across the entire exit of the float bath.

Preferably the deflecting surface is downstream of the exit.

In other embodiments of the first and/or second aspects of the present invention, the first jet direction of the first jet of fluid is at an angle to the vertical between 30° and 60°, preferably between 40° and 50°, more preferably between 44° and 46°.

In other embodiments of the first and/or second aspects of the present invention, the second jet direction of the first jet of fluid is at an angle of less than 30° to the vertical, preferably less than 20° to the vertical, more preferably less than 10° to the vertical, most preferably less than 5° to the vertical.

Other embodiments of the first and/or second aspects of the present invention have other preferable features.

Suitably the float bath comprises vent means for venting the reducing atmosphere from the enclosure. The vent means provide a way to control the pressure inside the float bath and/or to control the composition of the bath atmosphere in the float bath.

Preferably the first jet of fluid is pre-heated before moving in the first jet direction.

Preferably the first jet of fluid is heated before and/or after moving in the first jet direction and/or the second jet direction.

Preferably the first jet of fluid is at a temperature greater than 100° C., more preferably at a temperature between 200° C. and 300° C. when moving prior to, and/or when moving in, the first and/or second jet direction.

Preferably the first jet of fluid is at a temperature greater than 100° C., more preferably at a temperature between 200° C. and 300° C. after moving in the first and/or second jet direction.

Preferably the total volume of fluid provided to the at least one jets used to carry out a method according to the first or second aspect of the present invention is less than the amount of bath atmosphere that escapes from the opening in the exit end of the float bath exit without the carrying out a method according to the first or second aspect of the present invention.

Preferably the fluid is an inert fluid or a reducing fluid.

Preferably the fluid is a gas.

Preferably the fluid comprises nitrogen gas.

Preferably the fluid is a gas comprising greater than 90% by volume nitrogen gas.

Preferably the fluid is a gas comprising less than 1% by volume oxygen.

Preferably the flow of fluid to the at least one jet used to reduce the volume of bath atmosphere lost from the float bath via the opening is between $F_{min}$ and $F_{max}$, with $F_{min} < F_{max}$ and $F_{min}$ being between 5 Nm$^3$/h and 80 Nm$^3$/h and $F_{max}$ being between 90 Nm$^3$/h and 500 Nm$^3$/h. Preferably $F_{min}$ is 5 Nm$^3$/h or 10 Nm$^3$/h or 15 Nm$^3$/h or 20 Nm$^3$/h or 25 Nm$^3$/h or 30 Nm$^3$/h and wherein $F_{max}$ is 50 Nm$^3$/h or 100 Nm$^3$/h or 150 Nm$^3$/h or 200 Nm$^3$/h or 250 Nm$^3$/h or 300 Nm$^3$/h.

Preferably the flow of fluid to the at least one jet used to reduce the volume of bath atmosphere lost from the float bath via the opening is between 0.1 and 0.9 times the volume of bath atmosphere that escapes from the bath exit when the bath exit is not sealed.

Preferably the first jet of fluid is provided by a nozzle having a slit orifice.

Preferably the first jet of fluid is a provided by a flat fan nozzle.

Preferably the first jet of fluid has a spray angle between 15° and 130°.

Preferably the first jet direction of the first jet of fluid and/or the second jet direction of the first jet of fluid is at an angle of 65° or less to the vertical.

When there is a plurality of jets of fluid, preferably at least two jets of fluid are provided by a respective nozzle having a respective slit orifice, more preferably each jet of fluid is provided by a respective nozzle having a respective slit orifice.

When there is a plurality of jets of fluid, preferably at least two jets of fluid are provided by provided by a respective flat fan nozzle, more preferably each jet of fluid is provided by a respective flat fan nozzle.

When there is a plurality of jets of fluid, preferably at least two jets of fluid have a spray angle between 15° and 130°, more preferably each jet of fluid has a spray angle between 15° and 130°, even more preferably each jet of fluid has the same, or substantially the same, spray angle, which may be between 15° and 130°.

When there is a plurality of jets, preferably the spacing of two jets in the plurality of jets is chosen to avoid bath atmosphere escaping from in between the two jets, more preferably wherein the spacing of two adjacent jets is chosen to avoid bath atmosphere escaping from in between the two adjacent jets.

When there is a plurality of jets, preferably the spacing of the plurality of jets is chosen to avoid bath atmosphere escaping from in between the separate jets.

When there is a plurality of jets of fluid, preferably at least two adjacent jets of fluid are configured to at least partially overlap.

The present invention also provides from a third aspect a float bath comprising an enclosure for containing a reducing atmosphere, the enclosure having inlet means for introducing molten glass into the enclosure, and outlet means for allowing formed glass to exit the enclosure to a conveying means outside the enclosure, the conveying means having a conveyance plane, the outlet means comprising a barrier configured such that the formed glass exits the enclosure through an opening defined by at least a portion of the barrier, wherein downstream of the barrier is located sealing means comprising an array or one or more nozzles configured to direct one or more jets of fluid, preferably gas, in a first jet direction followed by a second jet direction towards the conveyance plane.

Preferably the float bath comprises means for deflecting the one or more jets of fluid towards the conveyance plane such that the first jet direction is different to the second jet direction of a respective jet of fluid.

Preferably at least one nozzle has a slit orifice.

Preferably the float bath comprises at least one obstruction downstream of the outlet means, the at least one obstruction being configured to change the direction of the first jet of fluid from the second direction to a third direction. In use, the obstruction is preferably a roller or an upper surface of a ribbon of glass.

The present invention also provides from a fourth aspect an assembly for reducing the volume of bath atmosphere lost from an exit end of a float bath, the assembly comprising a barrier for a float bath and a sealing means comprising an array or one or more nozzles configured to direct one or more jets of fluid, preferably gas, in the direction of the barrier, the assembly being configured such that the one or more jets of fluid have a first jet velocity followed by a second jet velocity, and the first jet velocity is different from the second jet velocity by deflection of the one or more jets off the barrier and/or off a deflecting surface downstream of the barrier.

The assembly may be used when a ribbon of glass is being conveyed away from the exit end of the float bath.

If the assembly is used when a ribbon of glass is not being conveyed away from the exit end of the float bath, preferably the assembly comprises an obstruction for positioning downstream of the barrier for causing the one or more jets of fluid to change velocity from the second velocity to a third velocity.

BRIEF DESCRIPTION OF THE DRAWINGS

Embodiments of the present invention will now be described by way of example only with reference to the accompanying drawings, in which:

FIG. 1 shows a schematic plan view of a float glass making furnace;

FIG. 2 shows a schematic side view of the float glass making furnace shown in FIG. 1 through the line X-X';

DETAILED DESCRIPTION OF THE INVENTION

Figure 3:
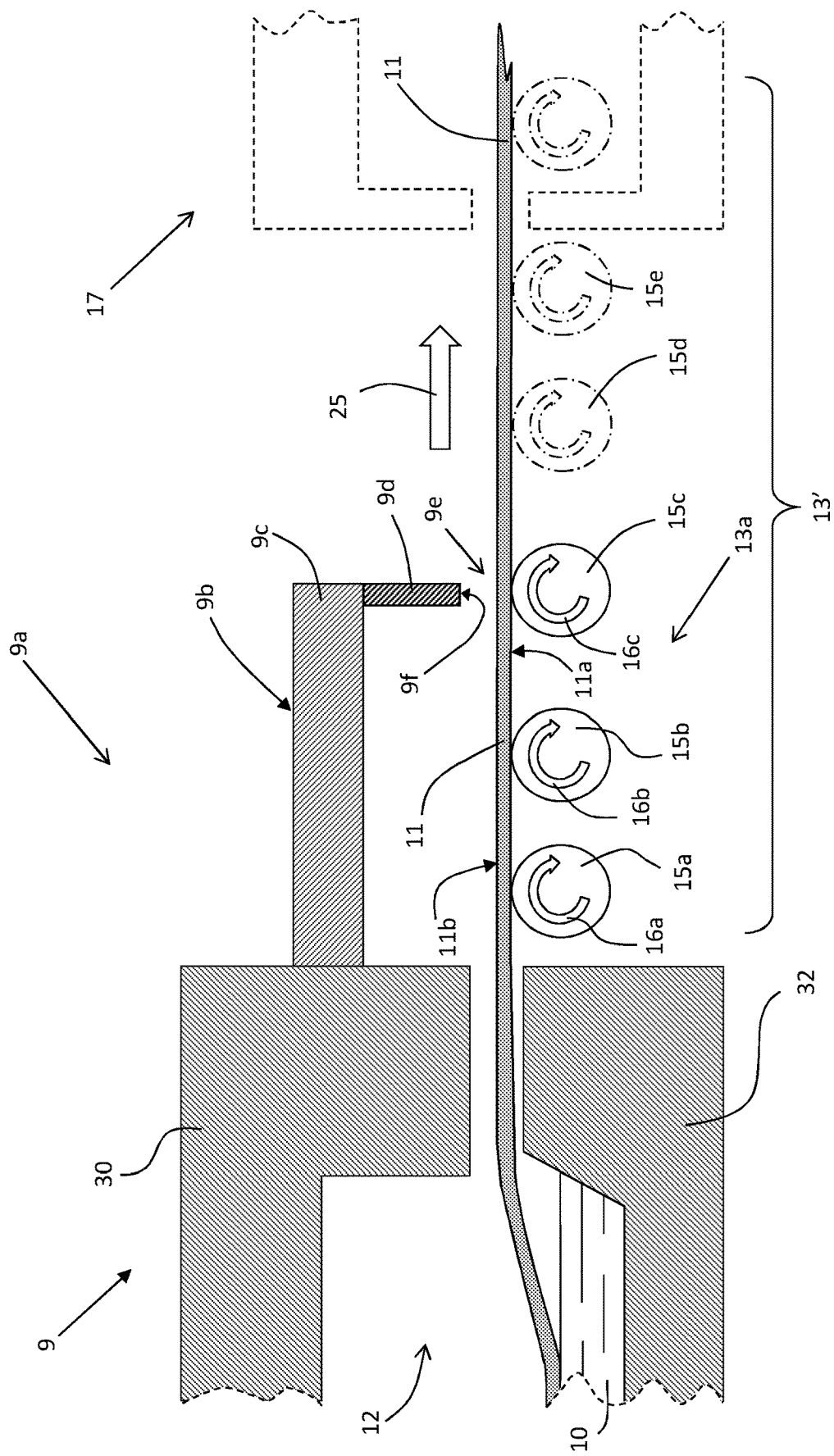
FIG. 3 shows a schematic cross-sectional view of part of an exit end of a float bath.

With reference to FIGS. 1 and 2, the float glass making furnace 1 comprises a feeding section 3 in communication with a furnace 5. Glass making raw materials 4 are fed to the feed section 3 to be converted into molten glass 6 in the furnace 5. The molten glass 6 may be refined (bubbles removed) and conditioned (allowed to cool to a temperature suitable for forming) in the furnace 5, or the furnace 5 may comprise connected sections for separately refining and/or conditioning the molten glass.

The molten glass 6 leaves the furnace 5 via a channel 7 and enters the float bath 9. The float bath 9 comprises an enclosure 9' which contains a pool of molten tin 10 for supporting molten glass 11' thereon. As is known in the art, the molten glass 11' spreads out on the surface of the molten tin 10 to form a glass ribbon 11. A float bath atmosphere 12 comprising nitrogen and hydrogen is maintained above the surface of the molten tin 10 to prevent oxidation of the molten tin. The float bath atmosphere is at a slight positive pressure, typically between 1 and 30 Pa to help prevent ingress of air into the float bath. Typically the float bath 9 also comprises vents (not shown) to help control the pressure inside the float bath and/or the composition of the float bath atmosphere. In the art, "the float bath atmosphere" is often referred to as "the bath atmosphere".

The ribbon of glass 11 leaves the float bath exit end 9a through an opening in the enclosure and passes onto a roller conveyor section 13a comprising lift-out rollers enclosed in a hood section 9b. The lift-out rollers are part of a roller conveyor bed comprising conveyor roller section 13a and conveyor roller sections denoted generally as 13b and 13c. The lift-out rollers essentially transfer the ribbon of glass 11 from the surface of the molten tin onto the roller conveyor bed for conveyance to other downstream parts of the float glass making furnace. The ribbon of glass 11 is conveyed in the direction of arrow 25 (indicating the direction of conveyance) on the roller conveyor bed where each section comprises a plurality of spaced conveyor rolls 15 (only two of which are labelled in FIG. 1). The conveyor rolls 15 are transversely extending and have a longitudinal axis substantial orthogonal to the direction of conveyance 25 of the glass ribbon 11. The conveyor rolls define a conveyance plane in which the float glass ribbon lies when being conveyed. Typically the conveyance plane is parallel to the horizontal.

The ribbon of glass 11 is conveyed through an annealing furnace 17 to cool the glass ribbon to ambient conditions. The glass ribbon 11 then passes beneath a cutting section 19 configured to cut the glass ribbon into individual glass sheets 21, 23.

For the avoidance of doubt, the annealing furnace 17 is downstream of the float bath 9.

FIG. 3 shows a schematic cross-sectional view of a portion of an exit end of a float bath 9. The float bath 9 comprises an enclosure having a roof section 30, a bottom section 32 in contact with the molten tin 10 and sidewalls (not shown), such that the enclosure is substantially box shaped (see FIG. 2). There is a bath atmosphere 12 above the molten tin 10. As is known in the art, the glass ribbon 11 formed on the surface of the molten tin 10 is removed from the float bath 9 over lift-out rolls 15a, 15b and 15c which are part of conveyor roller section 13a.

The float bath 9 has an exit end 9a configured to allow the glass ribbon to exit the float bath from the enclosure to be conveyed on the roller conveyor bed (only a section of which is shown in FIG. 3 and labelled as 13'). The roller conveyor bed section 13a has three lift-out conveyor rollers 15a, 15b and 15c each rotating in the direction of respective arrow 16a 16b and 16c such that the direction of conveyance is in the direction of arrow 25. A line in tangential contact with the rollers 15a, 15b and 15c lies in a conveyance plane defined by the upper glass contacting portion of the rollers. When the ribbon of glass exits the float bath, the glass ribbon lies on or in the conveyance plane.

Above the lift-out rollers 15a, 15b and 15c is a hood section 9b for containing bath atmosphere comprising a refractory roof section 9c and an exit barrier 9d extending down from the roof section 9b towards the conveyance plane/float glass ribbon 11 to define an opening 9e between the lower end 9f of the exit barrier 9d and the upper conveying surface of the roller 15c. The opening 9e is sufficiently sized such that the ribbon of glass 11 can pass therethrough for subsequent conveyance into the annealing furnace 17 (shown in phantom) on conveyor rollers 15d, 15e etc.

As is known in the art, the exit end of a float bath may comprise a number of barriers extending across the width of the float bath (i.e. between the sidewalls) and/or between the walls of the hood section to help reduce the loss of float bath atmosphere via the opening 9e when the glass ribbon is being transferred through the opening 9e.

In the art the exit barrier 9d may be referred to as a drape. Typically the exit barrier 9d is a sheet of suitably heat resistant material. The exit barrier 9d may be movable relative to the lift-out roller 15c such that the height of the opening 9e may be varied.

The exit barrier 9d has two opposing major surfaces, one major surface facing the float bath 9, and the other opposing major surface facing the annealing furnace 17. One or both major surface of the exit barrier 9d may be flat or corrugated.

In the example shown in FIG. 3, the lower end 9f of the exit barrier 9d faces the upper facing portion of the lift-out roller 15c, although the exit barrier 9d may be spaced upstream of or downstream of the position of the exit barrier 9d as shown in FIG. 3. In these latter embodiments, the exit barrier 9d may still be above the lift-out roller 15c or above the space between the lift-out roller 15c and the adjacent upstream roller 15b or downstream roller 15d.

It is preferred to have the axis of rotation of the roller 15c substantially aligned with the lower end 9f of the exit barrier. It is preferred to have the exit barrier 9d arranged substantially parallel to the vertical.

The lower surface 11a of the ribbon of glass 11 forms a seal with the roller 15c by contact therewith, thereby preventing or reducing the loss of bath atmosphere from underneath the ribbon of glass. Arrangement of the exit barrier 9d downstream or upstream of the point of glass contact point on the roller 15c can affect the quality of this seal with the lower surface of the ribbon of glass.

Given that there is a positive pressure inside the float bath 9, float bath atmosphere 12 may escape from the float bath via the opening 9e in the exit end section 9a.

As the ribbon of glass 11 is conveyed in the direction of the arrow 25, upon passing through the opening 9e the atmosphere above the ribbon of glass changes from a float bath atmosphere to an air atmosphere.

Figure 4:
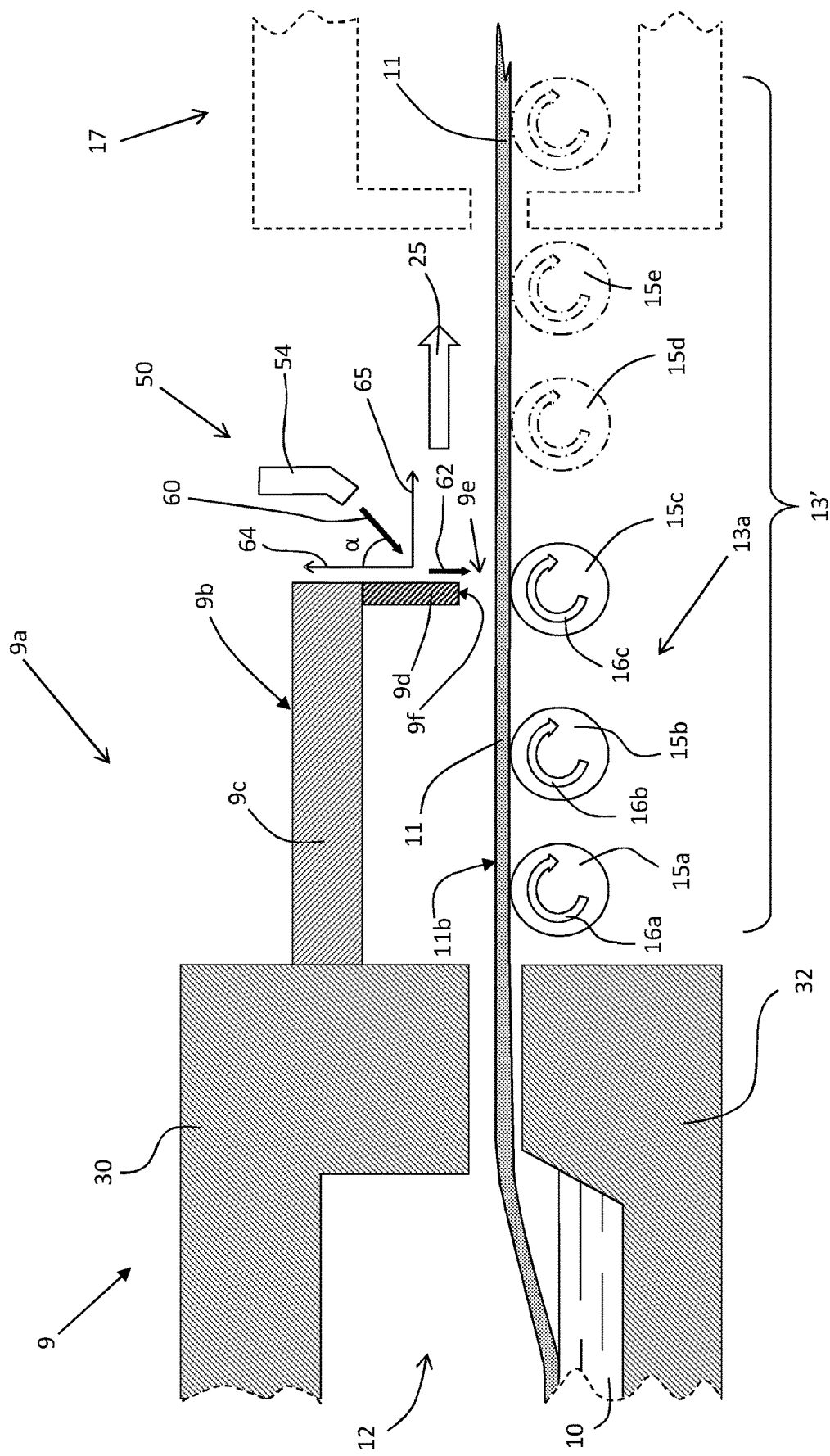
FIG. 4 shows a schematic cross-sectional view of an exit end of a float bath including apparatus for carrying out a method according to the present invention.
Figure 5:
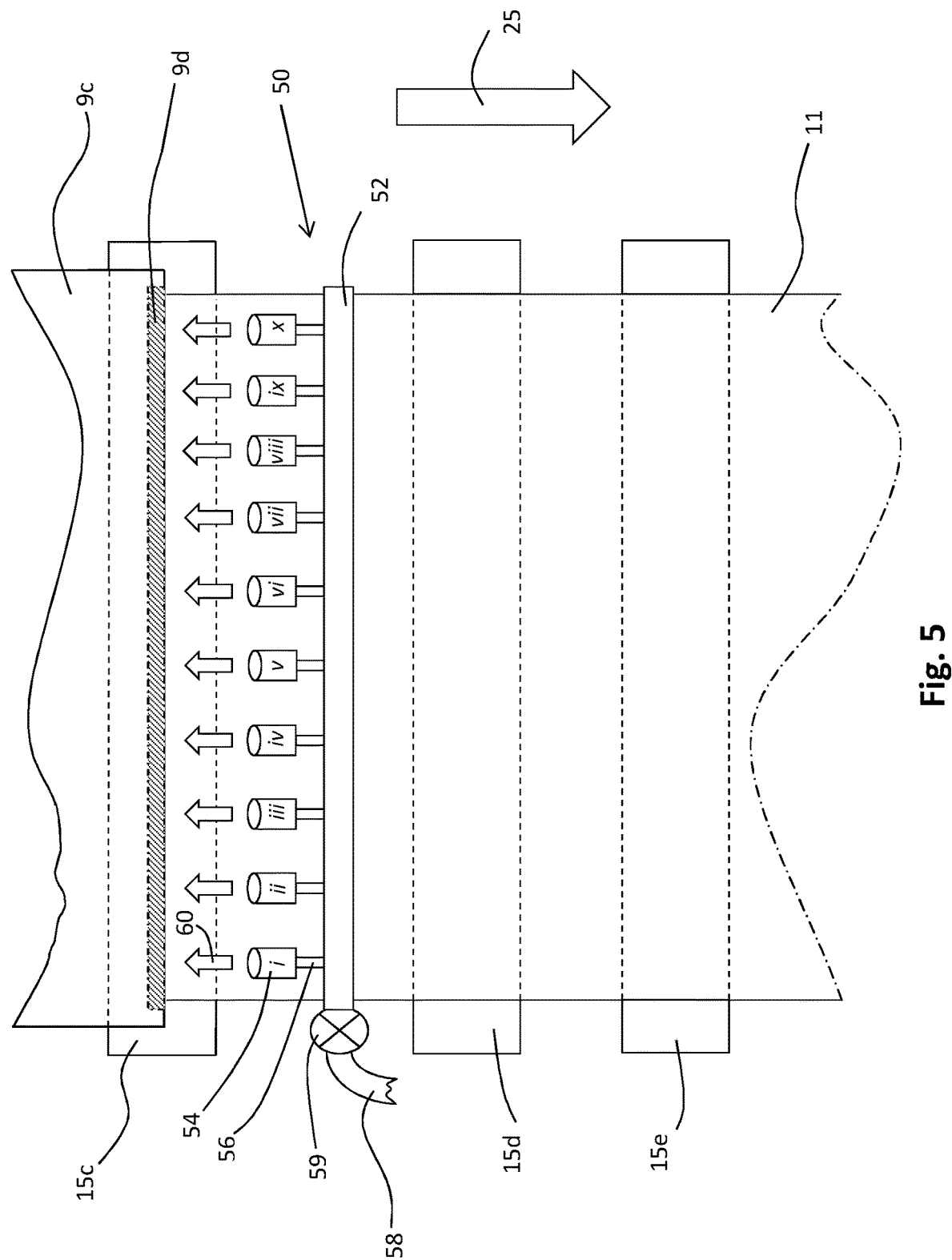
FIG. 5 shows a schematic plan view of the exit end of the float bath shown in FIG. 4.

FIGS. 4 and 5 are used describe the operation of an apparatus used to carry out a method in accordance with the first aspect of the present invention. The float bath 9 is the same as described with reference to FIG. 3 and operated in the same manner.

The float bath 9 was operated in a typical manner to determine the typical operational parameters when making a float glass ribbon on the particular float glass making furnace.

The particular float bath 9 had two vents (not shown) and for typical running conditions the two vents were placed in an operational configuration. Using a manometer the total flow through the vents was measured to be 265 $Nm^3/h$. The pressure inside the float bath 9 at a fixed measurement position (roughly mid-way down the length and width of the float bath) was measured using a digital manometer. Under these conditions (with the two vents in the operational configuration described above) the pressure inside the float bath was measured to be 15 Pa.

The two vents were then both closed so that no bath atmosphere could be vented from inside the float bath to the outside thereof via the two vents. The flow through the two vents was therefore 0 Nm³/h (because they were closed). The pressure inside the float bath at the same measurement position was measured to be 23 Pa. As expected, closing the vents increases the pressure inside the float bath, and in this example the pressure increase was 8 Pa. This pressure increase is therefore equivalent to a flow of 265 Nm³/h, because this volume of bath atmosphere is no longer being vented (i.e. escaping/lost) through the two vents.

In order to reduce the volume of bath atmosphere lost from the exit end 9a of the float bath 9, apparatus 50 was provided downstream of the exit end 9a i.e. downstream of the opening 9e. As FIGS. 4 and 5 illustrate, the apparatus 50 is outside of, or external to, the float bath 9 and exit end 9a. The apparatus 50 is located in the space between the opening 9e and the entrance to the annealing furnace 17. By having the apparatus 50 located outside of the float bath 9 and the exit end 9a, the apparatus 50 is able to be positioned at a suitable distance from the ribbon of glass 11 to minimise the risk of contact therewith.

The apparatus 50 comprises an array of ten nozzles 54 (each individual nozzle being labelled as i, ii, iii, iv, v, vi, vii, viii, ix and x to aid identification) each in fluid communication with a manifold 52 via a respective pipe 56 (only one of which is labelled in FIG. 5 for clarity).

The manifold 52 is supplied with nitrogen gas (nominally 100% nitrogen) via a suitable hose or pipe 58 and the pressure of the nitrogen gas supplied to the manifold is controllable by a valve 59. Suitably each or any combination of nozzle 54 (i, ii, iii, iv, v, vi, vii, viii, ix and x) may have a respective valve for controlling the flow of gas thereto. Other inert gases may be used. It is preferred not to use air due to the possible ingress of air under the barrier 9d through opening 9e thereby contaminating the bath atmosphere 12 i.e. with oxygen.

Upon supplying nitrogen gas to the manifold 52, a jet of nitrogen gas 60 is emitted from the end of each nozzle 54 (i, ii, iii, iv, v, vi, vii, viii, ix and x) towards the barrier 9d.

Each nozzle 54 is configured to emit the respective jet of nitrogen gas in a first direction (with a first jet velocity indicated by arrow 60) towards the exit barrier 9d to change the direction of the jet of nitrogen gas by striking the exit barrier 9d (to a second jet velocity indicated by arrow 62). This causes the jet of nitrogen gas to be deflected downwards at the second direction (and hence second velocity) towards the upper surface 11b of the ribbon of glass 11 i.e. towards the conveyance plane. Within the context of the present invention, the upper surface of the ribbon of glass is that major surface of the glass ribbon that has not been in contact with the molten tin (or other suitable molten metal) in the float bath. Consequently the surface opposite the upper surface of the ribbon of glass has been in contact with the molten tin in the float bath, and is typically referred to as the lower surface of the glass ribbon. The lower surface of the ribbon of glass usually has a higher content of tin in the surface thereof because of the contact of the lower surface of the ribbon of glass with the molten tin in the float bath.

Upon being deflected off the exit barrier 9d, the jet of nitrogen changes direction and is heated due to the temperature of the exit barrier 9d, which is typically greater than 500° C. i.e around 500-700° C.

The jets of nitrogen gas each having a respective second jet velocity are then caused to change velocity again such that each jet of nitrogen changes velocity to a respective third jet velocity due to the presence of the ribbon of glass to provide a seal at the opening 9e, thereby reducing the amount of bath atmosphere that may be lost from the opening 9e.

The target was to obtain a stagnation point beneath the lower end 9f of the exit barrier 9d i.e. such that the third jet velocity of each of the jets of nitrogen gas was zero. However it is possible to reduce the volume of bath atmosphere lost from the opening 9e in the exit end when the third jet velocity of the nitrogen jets has a velocity component in the direction of conveyance indicated by arrow 25. The jets of nitrogen gas have sufficient momentum flow to reduce the amount of bath atmosphere that may flow out of the opening 9e.

Under certain flow conditions the jets of nitrogen gas having a respective third jet velocity travel in the direction of conveyance and may strike the upper surface of the ribbon of glass at some point downstream of the opening 9e.

In this example the spacing between adjacent nozzles 54 (i.e. 54i and 54ii) was around 25 cm, although this may be altered depending upon the width of the float glass ribbon (and hence the width of the opening 9e in the exit end 9a of the float bath 9).

In this example each nozzle 54 is the same type and had a slit orifice through which the respective jet of nitrogen gas was emitted. Each jet of nitrogen gas had a spray angle of around 60° and the nozzles were arranged such that at least a portion of jets from adjacent nozzles overlapped upon striking the exit barrier 9d and/or the upper surface of the ribbon of glass 11. It is preferred to have at least a portion of jets from adjacent nozzles overlapping because then at least two adjacent jets of fluid are configured so that the adjacent jets push against each other in a direction perpendicular to the jet direction due to the turbulent diffusion of the jet momentum in directions perpendicular to the path of the jet. This helps ensure bath atmosphere cannot escape preferentially from in between the separate jets. The slit orifice may be substantially rectangular having a length between 5 mm and 10 mm, and a width between 0.05 mm and 0.5 mm.

Each nozzle 54 was configured to emit a flat jet at an angle $\alpha$ of 45° to the vertical (which is labelled as 64). The vertical is perpendicular to the horizontal, labelled as 65. In this example the horizontal is parallel to, or substantially parallel to, the upper surface of the ribbon of glass. For a flat jet, the fluid is emitted from a nozzle in the shape of a substantially flat fluid layer i.e. the flat jet of fluid has a velocity profile in a first direction that is significantly longer than the velocity profile in a second direction perpendicular to the first direction. The first direction of the velocity profile of the flat jet may be parallel to the upper surface of the ribbon of glass.

Under stable running conditions and without the apparatus 50 being switched on, the pressure inside the float bath at the measuring position was found to be 26 Pa.

To seal the exit end 9a of the float bath 9 such that the volume of bath atmosphere lost from the exit end was reduced, the nitrogen supply to the ten nozzles 54 was slowly increased using valve 59 until no flames could be seen emerging from the opening 9e. It was found for the particular stable running conditions, when the total volume of nitrogen gas through the ten nozzles was about 90 Nm³/h, the pressure inside the bath was found to increase to 33 Pa (from 26 Pa) and there were no flames emerging from the opening 9e.

With the exit end sealed, each jet of nitrogen gas has changed velocity from the respective second jet velocity to a respective third jet velocity due to the presence of the ribbon of glass 11.

Given that a under the typical miming conditions a pressure increase inside the float bath of 8 Pa equated to around 265 Nm³/h (from the experiment when the vents were closed), a 7 Pa pressure increase inside the float bath equates roughly to an atmosphere volume of 230 Nm³/h (⅞×265 Nm³/h) i.e. this amount of bath atmosphere is not lost from the exit end 9a of the float bath 9 through the opening 9e. Therefore if it was desired to run the float bath at this higher pressure, taking into account the flow of nitrogen gas to produce the seal (90 Nm³/h), the net bath atmosphere saving is around 140 Nm³/h because bath atmosphere is not lost from the exit end of the float bath due to the seal created by the operation of apparatus 50 as described above.

An additional benefit of having the seal is that during certain running conditions (typically during maintenance of the float bath exit end) the amount of air that may be drawn into the float bath may be reduced thereby reducing the oxygen content of the bath atmosphere. This was confirmed by using an oxygen probe inside the float bath enclosure where the oxygen inside the float bath enclosure dropped by a factor of 2-3 i.e. the $O_2$ content was two to three times lower when the opening 9e was sealed with a flow of 90 Nm³/h nitrogen from the jets 54 as described above, compared to when the jets were turned off and the pressure inside the float bath had reduced.

In this example the total flow of nitrogen gas was uniform through each of the ten nozzles 54 (i, ii, iii, iv, v, vi, vii, viii, ix and x), although it may be preferred to alter the flow of nitrogen gas to each of the nozzles in a different manner, for example, the flow rate to nozzles 54 (iv, v, vi and vii) may be higher than the flow rate to nozzles (i, ii, iii, viii, ix and x, where the flow rate to nozzles i, ii, iii, viii, ix and x is the same). Other configurations of flow rate to the nozzles are possible.

A second series of tests were carried out on the same float bath.

Under stable operation, the pressure inside the float bath at the same measuring position as before was measured to be about 15 Pa. Using the sealing apparatus 50, the total nitrogen gas flow to the nozzles was increased until no flames could be seen to emerge from the float bath exit i.e. at the opening 9e. At this point, the exit end 9a had been sealed.

The pressure inside the float bath was measured to be about 21 Pa, the increase being due to the lack of bath atmosphere loss from the opening 9e as described above. The pressure inside the float bath was then reduced to the pre-seal pressure (about 15 Pa) and consequently in this second test the volume of nitrogen gas that needed to be supplied to the float bath atmosphere was reduced by 230 Nm³/h to achieve the pre-seal pressure inside the float bath. In this second test this was achieved with a total nitrogen flow to the nozzles of 90 Nm³/h. Hence the net reduction in nitrogen gas usage was 140 Nm³/h, offering a cost reduction due to less nitrogen gas being required to achieve the same pressure in the float bath.

With reference to FIG. 4, if no glass ribbon 11 is being conveyed on the roller conveyor bed away from the opening 9e, the sealing apparatus 50 may still be used to reduce the volume of bath atmosphere lost from the float bath via the opening 9e.

In this case, each of the jets of nitrogen gas (from the nozzles 54) having the respective second jet velocity 62 are caused to change from the respective second jet velocity to a respective third jet velocity due to the presence of the upper surface of the lift out roller 15c, thereby reducing the volume of bath atmosphere lost from the float bath via the opening 9e. The upper surface of the lift out roller 15c is that portion of the roller configured to contact a ribbon of glass when a ribbon of glass is on the roller conveyor bed.

By suitable placement of the lift out roller 15c away from the opening 9e, a suitable obstruction (i.e. a refractory or metal shelf) may be positioned in the path of the jets of nitrogen having the second jet velocity 62 such that the jets of nitrogen having the respective second jet velocity change to a respective third jet velocity due to the presence of the obstruction to reduce the volume of bath atmosphere lost from the float bath via the opening 9e. As is evident, in the absence of the ribbon of glass 11 the lift out roller 15c functions as an obstruction.

Figure 6:
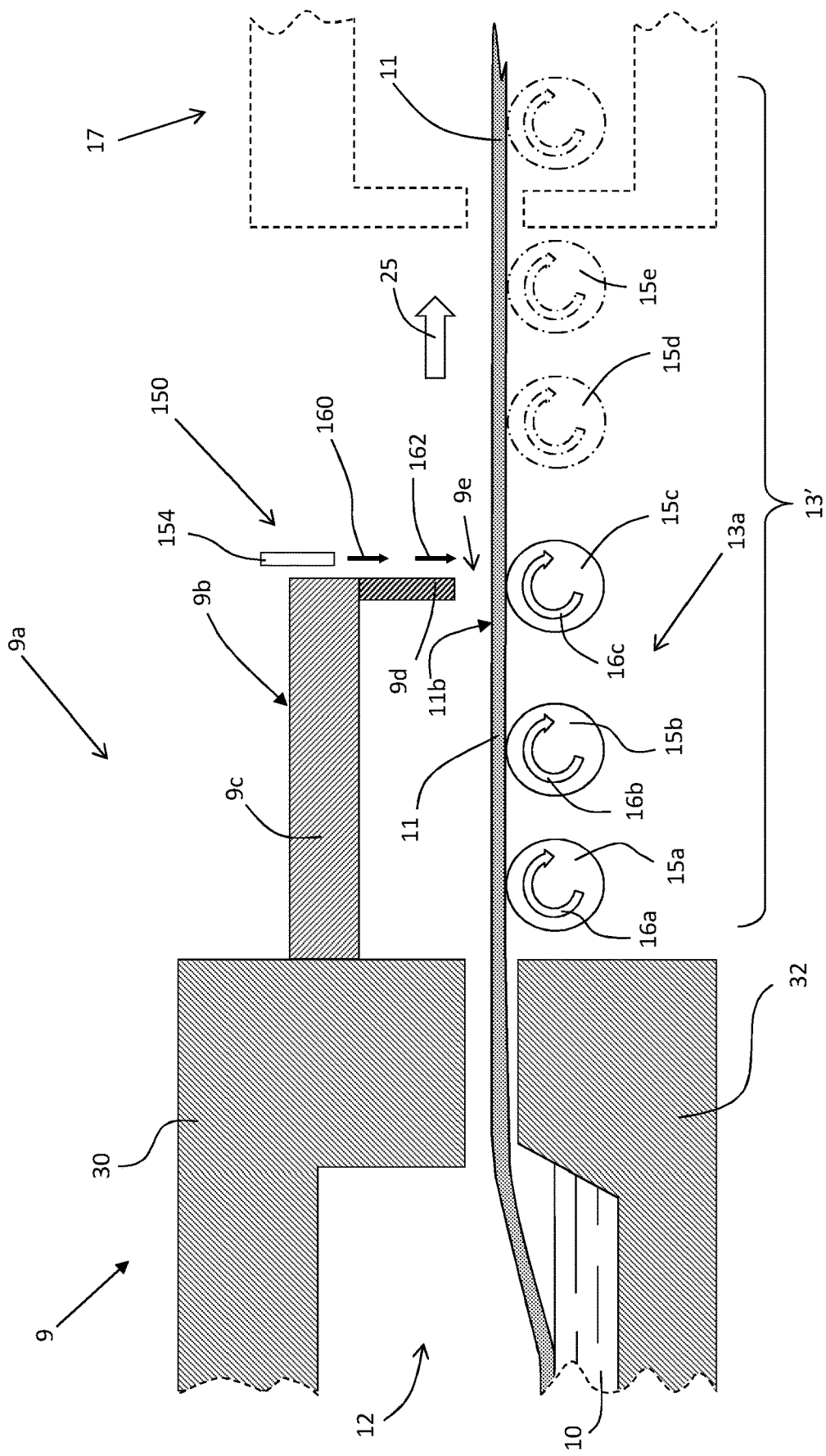
FIG. 6 shows a schematic cross-sectional view of an exit end of a float bath including another apparatus for carrying out a method according to the present invention.

Another type of apparatus that may be used to carry out a method in accordance with the first aspect of the present invention is to use an air-knife design, where long, thin shaped nozzles are arranged above and downstream of the opening in the exit end of the float bath for providing a continuous thin jet of gas across the full width of the opening. This is illustrated in FIG. 6 where an apparatus 150 comprising an array of such nozzles 154 is arranged downstream of the opening 9e in the exit end 9a of the float bath 9. The array of nozzles 154 are in fluid communication with a manifold (not shown, but see manifold 52 in FIG. 5).

The jets from the nozzles 154 have a first jet direction 160 that is the same as the final jet direction 162 i.e. jets 154 are not deflected (until they are caused to change direction due to the presence of the upper surface 11b of the ribbon of glass 11 adjacent to and downstream of the opening 9e).

An air-knife design may provide more uniform back-pressure, so may provide a more efficient seal than using angled jets. For a uniform distribution of air or more preferred inert gas i.e. nitrogen, a long and thin air-knife would be required, especially to fit into the relatively small space downstream of the float bath exit end and before the annealing section 17. Such a thin air knife may be more susceptible to deformation due to the relatively hot environment near the float bath exit end 9a, requiring more heat resistant materials, thereby potentially increasing costs.

As nitrogen gas passes through the manifold to the nozzles 154 there is a certain level of preheating of the nitrogen gas such that there is less of a thermal penalty in using cold nitrogen impacting the final exit barrier 9d. There may be a separate gas-preheat stage, or thermal energy from the local environment may be used to pre-heat the nitrogen gas.

Figure 7:
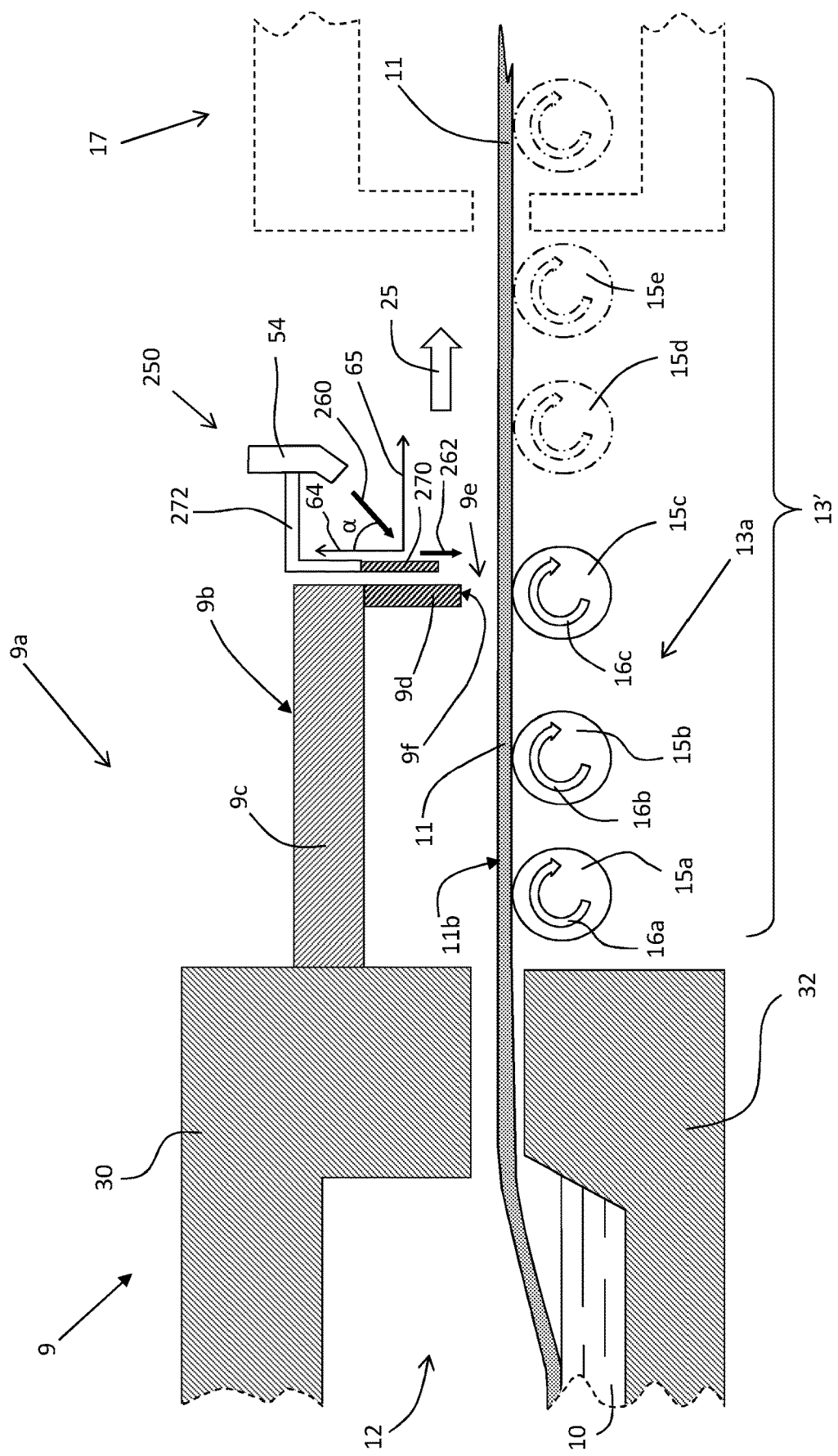
FIG. 7 shows a schematic cross-sectional view of an exit end of a float bath including another apparatus for carrying out a method according to the present invention.

FIG. 7 shows another embodiment of the present invention where sealing apparatus 250 is positioned downstream of the opening 9e/exit barrier 9d. In contrast to the embodiment shown in FIG. 4 where the exit barrier 9d is used to change the first jet velocity to the second jet velocity by striking the jets striking the exit barrier 9d as described above, the sealing apparatus 250 comprises a separate deflector 270 associated with each nozzle 54 in the array. The deflector 270 provides a deflecting surface for changing the direction of a jet of gas impacting thereon.

The array of nozzles is essentially the same as described with reference to FIGS. 4 and 5 except for the provision of the deflector 270. The deflector 270 may be a single strip to provide a deflecting surface for each nozzle in the array, or each nozzle may have its own deflector. This is advantageous because the amount of deflection provided to each jet from each nozzle may be varied separately.

Considering a single nozzle i.e. 54(i), the jet of gas from the nozzle is emitted at a first angle α to the vertical 64 and travels in the first direction shown by arrow 260 i.e. when the jet travels in the direction 260 it has a first velocity. Suitably the angle α is about 45°. The jet having the first velocity 260 strikes the deflector 270 and is deflected downwards, shown by arrow 262. The jet travelling in the second direction shown by arrow 262 is substantially parallel to the vertical 64 (and consequently substantially normal to the horizontal 65). The jet moving in the second direction has a second velocity.

The jet 262 is caused to change to a third jet direction (and hence third jet velocity) which is preferred to be in the direction of conveyance 25 although the target may be to obtain a stagnation point beneath the lower end 9f of the exit barrier 9e. The jet having the second and/or third jet direction may contact the upper surface 11b of the ribbon of glass, usually downstream of the opening 9e. The jet of gas having the third jet velocity has sufficient momentum flow to reduce the volume of bath atmosphere lost from the opening 9e in the exit end 9a of the float bath 9.

In this example the deflector 270 is in mechanical communication with the nozzle 54 by means of an arm 272 having an angled portion perpendicular thereto extending from the body of the nozzle 54 such that the deflector 270 is in a suitable position to deflect a jet of gas emitted from nozzle 54 from the first jet direction 260 to the second jet direction 262. The deflector 270 is downstream of the exit barrier 9d.

Alternatively a separate frame may be used to locate the or each deflector associated with the nozzles at the suitable position to deflect the or each jet of fluid from the first direction to the second direction i.e. first velocity to second velocity.

Although in the accompanying figures the exit barrier 9d is shown as having flat opposing major surfaces (one major surface facing the annealing furnace 17 and the opposite major surface facing the inside of the float bath 9), the major surfaces of the exit barrier 9d may be curved, or undulating such that the exit barrier 9d is corrugated. As such, when a jet of fluid is directed to impact and strike the exit barrier 9d to change the direction of the jet of fluid, the deflecting surface may not be flat, but instead may have a corrugated form with substantially parallel ridges and grooves, especially parallel to the vertical.

As is readily apparent from the FIGS. 4, 6 and 7, the lower surface of the ribbon of glass 11 forms a seal with the contact surface of the roller 15c, as described in relation to FIG. 3.

It will also be readily apparent that with reference to FIGS. 6 and 7, if no glass ribbon 11 is being conveyed on the roller conveyor bed away from the opening 9e, the sealing apparatus 150, 250 may still be used to reduce the volume of bath atmosphere lost from the float bath via the opening 9e.

In relation to FIG. 6, the jets of nitrogen gas (from the nozzles 154) having the second jet velocity 162 are caused to change velocity to a third jet velocity due to the presence of the upper surface of the lift out roller 15c, thereby reducing the volume of bath atmosphere lost from the float bath via the opening 9e.

In relation to FIG. 7, the jets of nitrogen gas (from the nozzles 254) having the second jet velocity 262 are caused to change to a third jet velocity due to the presence of the upper surface of the lift out roller 15c to reduce the volume of bath atmosphere lost from the float bath via the opening 9e.

By suitable placement of the lift out roller 15c away from the opening 9e, a suitable obstruction (i.e. a refractory or metal shelf) may be positioned in the path of the jets of nitrogen having the second jet velocity 162, 262 such that the obstruction causes the jets of nitrogen to change velocity to a respective third jet velocity to reduce the volume of bath atmosphere lost from the float bath via the opening 9e.

The present invention provides a method of reducing the volume of bath atmosphere lost from the exit end of a float bath, thereby providing cost savings and the ability to maintain improved atmosphere conditions and control inside the float bath.

The present invention therefore provides a method of reducing the volume of float bath atmosphere lost from an opening in the exit end of the float bath. The method comprises directing a first jet of fluid having a first jet velocity followed by a second jet velocity towards a plane a conveyance for a float glass ribbon. An obstruction in the path of the first jet of fluid causes the jet to change from the second to a third jet velocity. The obstruction may be a portion of a roller positioned outside the opening or a float glass ribbon that has been formed on a surface of molten metal contained in the float bath that has subsequently transferred through the opening.

The invention claimed is:

1. A method of reducing the volume of float bath atmosphere lost from an exit end of a float bath, the float bath comprising an enclosure for containing the bath atmosphere, the exit end comprising a first opening through which a ribbon of glass supported on a pool of molten metal contained in the enclosure can pass from inside the enclosure to a conveying means positioned outside the enclosure, the conveying means configured to convey the ribbon of glass in a first direction of conveyance away from the enclosure along a conveyance plane towards a second opening, the method comprising the step of (i) directing at least one (a first) jet of fluid towards the conveyance plane, the first jet of fluid having a first jet velocity and a subsequent second jet velocity, the first jet velocity of the first jet of fluid having a first jet speed and a first jet direction and the second jet velocity of the first jet of fluid having a second jet speed and a second jet direction; wherein the first jet of fluid is caused to change direction such that the second jet direction of the first jet of fluid is different to the first jet direction of the first jet of fluid; and further wherein the first jet of fluid having the second jet velocity is directed towards the conveyance plane downstream of the second opening and the first jet of fluid having the second jet velocity changes from the second jet velocity to a third jet velocity due to the presence of an obstruction in the path of the first jet of fluid having the second velocity to reduce the volume of bath atmosphere lost from the float bath via the second opening.

2. The method according to claim 1, wherein the obstruction is positioned outside of the second opening.

3. The method according to claim 1, wherein the obstruction comprises at least a portion of a roller.

4. The method according to claim 1, wherein the first jet direction of the first jet of fluid and/or the second jet direction of the first jet of fluid is at an angle of 65° or less to the vertical.

5. The method according to claim 1, wherein the third jet velocity of the first jet of fluid is zero or wherein the third jet direction of the first jet of fluid is in the direction of conveyance and/or wherein the first jet direction of the first jet of fluid or the second jet direction of the first jet of fluid is parallel to the vertical.

6. The method according to claim 1, wherein the fluid is an inert fluid or a reducing fluid.

7. The method according to claim 1, wherein the fluid is a gas.

8. The method according to claim 7, wherein the gas comprises less than 1% by volume oxygen.

9. The method according to claim 1, wherein the flow of fluid to the at least one jet is between $F_{min}$ and $F_{max}$, with $F_{min}<F_{max}$ and $F_{min}$ being between 5 $Nm^3/h$ and 80 $Nm^3/h$ and $F_{max}$ being between 90 $Nm^3/h$ and 500 $Nm^3/h$.

10. The method according to claim 1, wherein the first jet speed of the first jet of fluid and/or the second jet speed of the first jet of fluid is less than the speed of sound in dry air at 20° C.

11. The method according to claim 1, wherein the obstruction is a float glass ribbon that has been formed on a surface of the pool of molten metal contained in the enclosure that has subsequently been transferred though the first opening or wherein the obstruction is an upper surface of a ribbon of glass.

12. The method according to claim 1, wherein the obstruction comprises a deflecting element extending away from the second opening.

13. The method according to claim 1, wherein the first jet of fluid is heated before and/or after moving in the first jet direction and/or the second jet direction.

14. The method according to claim 1, wherein the first jet of fluid is caused to change direction from the first jet direction to the second jet direction by impacting on a deflecting surface.

15. The method according to claim 14, wherein the deflecting surface is a barrier configured to reduce the volume of bath atmosphere lost from the second opening in the exit end of the float bath.

16. The method according to claim 14, wherein the deflecting surface is at a temperature greater than 400° C.

17. A float bath comprising an enclosure for containing a reducing atmosphere and a hood section comprising a number of barriers extending between walls of the hood section, the enclosure having inlet means for introducing molten glass into the enclosure, and outlet means for allowing formed glass to exit the enclosure to a conveying means outside the enclosure, the conveying means having a conveyance plane, the outlet means comprising an exit barrier configured such that the formed glass exits the hood section through an opening defined by at least a portion of the exit barrier, wherein downstream of the exit barrier is located sealing means comprising an array or one or more nozzles configured to direct one or more jets of fluid, preferably gas, in a first jet direction followed by a second jet direction towards the conveyance plane, wherein the float bath further comprises means for deflecting the one or more jets of fluid towards the opening such that the first jet direction is different to the second jet direction of a respective jet of fluid.

18. The float bath according to claim 17, further comprising at least one obstruction downstream of the outlet means, the at least one obstruction being configured to change the direction of the first jet of fluid from the second direction to a third direction.

19. The float bath according to claim 17, wherein at least one nozzle of the array of one of more nozzles has a slit orifice.

20. The float bath according to claim 17, wherein the obstruction is (i) a float glass ribbon; or (ii) at least a portion of a roller; or (iii) a deflecting element extending away from the opening.

* * * * *